United States Patent [19]
McGuire et al.

[11] Patent Number: 6,148,496
[45] Date of Patent: Nov. 21, 2000

[54] METHOD FOR MAKING A SEAMLESS APERTURED METAL BELT

[75] Inventors: Kenneth S. McGuire, Wyoming; Peter W. Hamilton, Cincinnati, both of Ohio

[73] Assignee: The Procter & Gamble Company, Cincinnati, Ohio

[21] Appl. No.: 09/289,223

[22] Filed: Apr. 9, 1999

[51] Int. Cl.$^7$ .............................. B21D 39/03; B23P 11/00
[52] U.S. Cl. .............................. 29/428; 29/445; 474/237; 474/249; 474/254; 474/260; 198/844.2; 198/846
[58] Field of Search ..................... 29/428, 445; 474/237, 474/254, 253, 249, 260, 268; 198/844.1, 844.2, 846, 847

[56] References Cited

U.S. PATENT DOCUMENTS

| | | | |
|---|---|---|---|
| D. 331,665 | 12/1992 | Underhill | D5/53 |
| D. 373,026 | 8/1996 | Delebreau et al. | D5/20 |
| D. 381,810 | 8/1997 | Schultz et al. | D5/37 |

(List continued on next page.)

FOREIGN PATENT DOCUMENTS

| | | |
|---|---|---|
| 570960 | 9/1958 | Belgium . |
| 0037101 A1 | 10/1981 | European Pat. Off. . |
| 0 621082 A1 | 10/1994 | European Pat. Off. . |
| 0623332 A1 | 11/1994 | European Pat. Off. . |
| 1315903 | 12/1962 | France . |
| 1429312 | 1/1966 | France . |
| 3-002292 | 1/1991 | Japan . |
| 07246216 | 9/1995 | Japan . |
| 975783 | 11/1964 | United Kingdom . |
| 1069445 | 5/1967 | United Kingdom . |
| WO 92/00187 | 1/1992 | WIPO . |
| WO 95/11945 | 5/1995 | WIPO . |
| WO 95/31225 | 11/1995 | WIPO . |
| WO 96/31652 | 10/1996 | WIPO . |
| WO 97/18276 | 5/1997 | WIPO . |

OTHER PUBLICATIONS

Martin Gardner –"Penrose Tiles to Trapdoor Ciphers", *Chapter 1 Penrose Tiling*, pp. 1–18; (Pub. Mathematical Assn. of America –(1997).

Broughton, J., et al., "Porous Cellular Ceramic Membranes: A Stochastic Model to Describe the Structure of an Anodic Oxide Membrane", Journal of Membrane Science 106, pp. 89–101 (1995).

Lim, J.H.F., et al., "Statistical Models to Describe the Structure of Porous Ceramic Membranes", Separation Science and Technology, 28(1–3), pp. 821–854 (1993).

Watson, D.F., "Computing the η–dimensional Delaunay Tessellation with Application to Voronoi Polytopes", The Computer Journal, vol. 24, No. 2, pp. 167–172 (1981).

*Primary Examiner*—David P. Bryant
*Assistant Examiner*—Jermie E. Cozart
*Attorney, Agent, or Firm*—Leonard W. Lewis

[57] ABSTRACT

The present invention provides a method for making a seamless apertured belt comprising the steps of: (a) providing a strip of material having two opposing ends and having a length at least equal to a finished belt length; (b) providing an aperture pattern having a length substantially equal to the finished belt length, the pattern including a plurality of two-dimensional geometrical shapes, the pattern having opposing end edges which can be tiled together; (c) removing a pre-determined portion of each end of the pattern and joining the pre-determined portions to one another along the opposing end edges to form a re-etch pattern; (d) forming apertures in the strip corresponding to the two-dimensional geometrical shapes in the pattern, the strip remaining free of apertures in regions near each end comprising fusion zones; (e) fusing the ends of the strip to one another such that the fusion zones form a common fusion zone; and (f) forming apertures in the common fusion zone corresponding to the re-etch pattern. In a preferred embodiment, the two-dimensional pattern is an amorphous two-dimensional pattern of interlocking two-dimensional geometrical shapes. The strip of material may comprise a material selected from the group consisting of metal, plastic, fabric, rubber, and combinations thereof.

10 Claims, 5 Drawing Sheets

U.S. PATENT DOCUMENTS

| | | | |
|---|---|---|---|
| 680,533 | 8/1901 | Marinier et al. | |
| 690,822 | 1/1902 | Avril. | |
| 1,358,891 | 11/1920 | Steedman. | |
| 1,454,364 | 5/1923 | Winchenbaugh et al. | |
| 2,054,313 | 9/1936 | Wilbur | 24/67 |
| 2,681,612 | 6/1954 | Reimann | 101/25 |
| 2,838,416 | 6/1958 | Babiarz et al. | 117/11 |
| 2,855,844 | 10/1958 | Stewart | 101/23 |
| 2,861,006 | 11/1958 | Salditt | 117/7 |
| 3,018,015 | 1/1962 | Agriss et al. | 217/53 |
| 3,024,154 | 3/1962 | Singleton et al. | 156/209 |
| 3,312,005 | 4/1967 | McElroy | 40/2 |
| 3,386,846 | 6/1968 | Lones | 117/11 |
| 3,484,835 | 12/1969 | Trounstine et al. | 161/130 |
| 3,554,835 | 1/1971 | Morgan | 156/234 |
| 3,573,136 | 3/1971 | Gardner | 156/384 |
| 3,585,101 | 6/1971 | Stratton et al. | 161/116 |
| 3,592,722 | 7/1971 | Morgan | 161/148 |
| 3,708,366 | 1/1973 | Donnelly | 156/209 |
| 3,850,095 | 11/1974 | Snyder | 101/32 |
| 3,853,129 | 12/1974 | Kozak | 128/287 |
| 3,867,225 | 2/1975 | Nystrand | 156/209 |
| 3,879,330 | 4/1975 | Lustig | 260/31.8 |
| 3,901,237 | 8/1975 | Cepuritis et al. | 128/284 |
| 3,911,187 | 10/1975 | Raley | 428/180 |
| 3,937,221 | 2/1976 | Tritsch | 128/287 |
| 3,943,609 | 3/1976 | Egan, Jr. | 24/73 |
| 3,950,480 | 4/1976 | Adams et al. | 264/284 |
| 3,967,624 | 7/1976 | Milnamow | 128/287 |
| 4,023,570 | 5/1977 | Chinai et al. | 128/290 |
| 4,054,697 | 10/1977 | Reed et al. | 428/40 |
| 4,061,820 | 12/1977 | Magid et al. | 428/311 |
| 4,067,337 | 1/1978 | Ness | 128/287 |
| 4,133,152 | 1/1979 | Penrose | 52/105 |
| 4,181,752 | 1/1980 | Martens et al. | 427/54.1 |
| 4,273,889 | 6/1981 | Yamazaki et al. | 525/109 |
| 4,303,485 | 12/1981 | Levens | 204/159.24 |
| 4,325,768 | 4/1982 | Schulz | 156/206 |
| 4,336,804 | 6/1982 | Roeder | 128/290 |
| 4,337,772 | 7/1982 | Roeder | 128/290 |
| 4,339,088 | 7/1982 | Niedermeyer | 242/1 |
| 4,342,314 | 8/1982 | Radel et al. | 128/287 |
| 4,376,147 | 3/1983 | Byrne et al. | 428/167 |
| 4,376,440 | 3/1983 | Whitehead et al. | 604/387 |
| 4,392,897 | 7/1983 | Herrington | 156/66 |
| 4,397,905 | 8/1983 | Dettmer et al. | 428/180 |
| 4,404,242 | 9/1983 | Squier | 428/35 |
| 4,405,666 | 9/1983 | Squier | 428/35 |
| 4,410,130 | 10/1983 | Herrington | 383/62 |
| 4,413,109 | 11/1983 | Haas | 526/348 |
| 4,427,107 | 1/1984 | Roberts et al. | 198/847 |
| 4,460,634 | 7/1984 | Hasegawa | 428/124 |
| 4,508,256 | 4/1985 | Radel et al. | 228/152 |
| 4,509,908 | 4/1985 | Mullane, Jr. | 425/290 |
| 4,514,345 | 4/1985 | Johnson et al. | 264/22 |
| 4,519,095 | 5/1985 | Clayton | 383/86 |
| 4,528,239 | 7/1985 | Trokhan | 428/247 |
| 4,543,142 | 9/1985 | Kuepper et al. | 156/209 |
| 4,546,029 | 10/1985 | Cancio et al. | 428/141 |
| 4,556,595 | 12/1985 | Ochi | 428/143 |
| 4,576,850 | 3/1986 | Martens | 428/156 |
| 4,578,069 | 3/1986 | Whitehead et al. | 604/370 |
| 4,587,152 | 5/1986 | Gleichenhagen et al. | 428/195 |
| 4,612,221 | 9/1986 | Biel et al. | 428/35 |
| 4,655,761 | 4/1987 | Grube et al. | 604/389 |
| 4,659,608 | 4/1987 | Schulz | 428/171 |
| 4,695,422 | 9/1987 | Curro et al. | 264/504 |
| 4,699,622 | 10/1987 | Toussant et al. | 604/389 |
| 4,743,242 | 5/1988 | Grube et al. | 604/389 |
| 4,778,644 | 10/1988 | Curro et al. | 264/557 |
| 4,803,032 | 2/1989 | Schulz | 264/284 |
| 4,820,589 | 4/1989 | Dobreski et al. | 428/422 |
| 4,839,216 | 6/1989 | Curro et al. | 428/134 |
| 4,894,275 | 1/1990 | Pelzer | 428/166 |
| 4,946,527 | 8/1990 | Battrell | 156/60 |
| 4,959,265 | 9/1990 | Wood et al. | 428/343 |
| 5,008,139 | 4/1991 | Ochi et al. | 428/40 |
| 5,080,957 | 1/1992 | Leseman et al. | 428/167 |
| 5,098,522 | 3/1992 | Smurkoski et al. | 162/358 |
| 5,112,674 | 5/1992 | German et al. | 428/216 |
| 5,116,677 | 5/1992 | Jones | 428/349 |
| 5,141,790 | 8/1992 | Calhoun et al. | 428/40 |
| 5,165,982 | 11/1992 | Gubitz et al. | 428/156 |
| 5,175,049 | 12/1992 | Huff et al. | 428/218 |
| 5,176,939 | 1/1993 | Shepherd | 427/146 |
| 5,208,096 | 5/1993 | Dohrer | 428/218 |
| 5,215,617 | 6/1993 | Grupe | 156/209 |
| 5,215,804 | 6/1993 | Hagens et al. | 428/156 |
| 5,221,276 | 6/1993 | Battrell | 604/389 |
| 5,245,025 | 9/1993 | Trokhan et al. | 536/56 |
| 5,246,762 | 9/1993 | Nakamura | 428/172 |
| 5,269,776 | 12/1993 | Lancaster et al. | 604/387 |
| 5,273,805 | 12/1993 | Calhoun et al. | |
| 5,273,809 | 12/1993 | Simmons | 428/212 |
| 5,275,588 | 1/1994 | Matsumoto et al. | 604/372 |
| 5,296,277 | 3/1994 | Wilson et al. | 428/40 |
| 5,300,347 | 4/1994 | Underhill et al. | 428/171 |
| 5,310,587 | 5/1994 | Akahori et al. | 428/35.2 |
| 5,324,279 | 6/1994 | Lancaster et al. | 604/387 |
| 5,334,428 | 8/1994 | Dobreski et al. | 428/34.9 |
| 5,339,730 | 8/1994 | Ruppel et al. | 101/32 |
| 5,342,250 | 8/1994 | Roberts et al. | 198/847 |
| 5,342,344 | 8/1994 | Lancaster et al. | 604/387 |
| 5,344,693 | 9/1994 | Sanders | 428/167 |
| 5,382,464 | 1/1995 | Ruppel et al. | 428/172 |
| 5,436,057 | 7/1995 | Schulz | 428/156 |
| 5,453,296 | 9/1995 | Lauritzen et al. | 427/208.6 |
| 5,458,938 | 10/1995 | Nygard et al. | 428/40 |
| 5,487,929 | 1/1996 | Rusincovitch, Jr. et al. | 428/40 |
| 5,514,122 | 5/1996 | Morris et al. | 604/387 |
| 5,518,801 | 5/1996 | Chappell et al. | 428/152 |
| 5,527,112 | 6/1996 | Dais et al. | 383/211 |
| 5,575,747 | 11/1996 | Dais et al. | 493/213 |
| 5,585,178 | 12/1996 | Calhoun et al. | 428/343 |
| 5,589,246 | 12/1996 | Calhoun et al. | 428/120 |
| 5,597,639 | 1/1997 | Schulz | 428/156 |
| 5,622,106 | 4/1997 | Rayner | 101/32 |
| 5,662,758 | 9/1997 | Hamilton et al. | 156/221 |
| 5,686,168 | 11/1997 | Laurent et al. | 428/179 |
| 5,736,223 | 4/1998 | Laurent | 428/154 |
| 5,871,607 | 2/1999 | Hamilton et al. | 156/221 |
| 5,965,235 | 10/1999 | McGuire et al. | 474/237 |

METHOD FOR MAKING A SEAMLESS APERTURED METAL BELT

FIELD OF THE INVENTION

The present invention relates to methods for forming seams in endless apertured belts of material. The present invention further relates to a method of creating such seams without accompanying disruptions in the aperture pattern.

BACKGROUND OF THE INVENTION

The use of amorphous patterns for the prevention of nesting in wound rolls of three dimensional sheet products has been disclosed in commonly-assigned, co-pending U.S. patent application Ser. No. 08/745,339 now U.S. Pat. No. 5,965,235, filed Nov. 8, 1996 in the names of McGuire, Tweddell, and Hamilton, entitled "Three-Dimensional, Nesting-Resistant Sheet Materials and Method and Apparatus for Making Same", the disclosure of which is hereby incorporated herein by reference. In this application, a method of generating amorphous patterns with remarkably uniform properties based on a constrained Voronoi tesselation of 2-space was outlined. Using this method, amorphous patterns consisting of an interlocking networks of irregular polygons are created using a computer.

The patterns created using the method described in the above mentioned application work quite well for flat, small materials. However, when one tries to use these patterns in the creation of production tooling (such as embossing rolls or belts), there is an obvious seam where the pattern "meets" as it is wrapped around the roll or belt due to the diverse edges of the pattern. Further, for very large rolls or belts, the computing time required to generate the pattern to cover these rolls or belts becomes overwhelming. What is needed then, is a method of creating these amorphous patterns that allows "tiling." As utilized herein, the terms "tile", "tiling", and "tiled" refer to a pattern or pattern element comprising a bounded region filled with a pattern design which can be joined edge-wise to other identical patterns or pattern elements having complementary but non-identical edge geometries to form a larger pattern having no visually-apparent seam. If such a "tiled" pattern were used in the creation of an embossing roll, there would be no appearance of a seam where flat the pattern "meets" as it is wrapped around the roll. Further, a very large pattern (such as the surface of a large embossing roll) could be made by "tiling" a small pattern, and there would be no appearance of a seam at the edges of the small pattern tiles.

Notwithstanding the development of various patterns, there remains the difficult task of forming an endless apertured belt of material to serve as a forming structure for forming three-dimensional webs with patterns of protrusions corresponding to apertures in the belt. Prior art belt forming techniques generally rely upon welding or fusing non-apertured ends of the belt material together and drilling holes therethrough to approximate the appearance of the patterned apertures. However, particularly with amorphous patterns, the regular nature of drilled holes creates a readily visibly discernible seam in the belt, and hence a corresponding interruption in the pattern of protrusions in the finished product. Forming patterned apertures all the way to the ends of the belt material likewise creates a difficult challenge in terms of satisfactorily fusing discontinuous end edges of the material together. For example, a commonly used method of converting a thin metal strip into a cylindrical belt is by butt-welding the strip into a cylinder using a high energy beam (electron beam or laser beam) as the energy source. One requirement of this welding step is that the welding be carried out across a continuous strip of metal. Interruptions in the metal cause the welding to be inaccurate and discontinuous as holes are left by the beam at the entrance and exit of a weld line.

Accordingly, it would be desirable to provide a method of creating continuous apertured belts with no readily discernible seam or interruption in amorphous patterns of apertures.

SUMMARY OF THE INVENTION

The present invention provides a method for making a seamless apertured belt comprising the steps of: (a) providing a strip of material having two opposing ends and having a length at least equal to a finished belt length; (b) providing an aperture pattern having a length substantially equal to the finished belt length, the pattern including a plurality of two-dimensional geometrical shapes, the pattern having opposing end edges which can be tiled together; (c) removing a pre-determined portion of each end of the pattern and joining the pre-determined portions to one another along the opposing end edges to form a re-etch pattern; (d) forming apertures in the strip corresponding to the two-dimensional geometrical shapes in the pattern, the strip remaining free of apertures in regions near each end comprising fusion zones; (e) fusing the ends of the strip to one another such that the fusion zones form a common fusion zone; and (f) forming apertures in the common fusion zone corresponding to the re-etch pattern.

In a preferred embodiment, the two-dimensional pattern is an amorphous two-dimensional pattern of interlocking two-dimensional geometrical shapes. The strip of material may comprise a material selected from the group consisting of metal, plastic, fabric, rubber, and combinations thereof.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Figure 1:
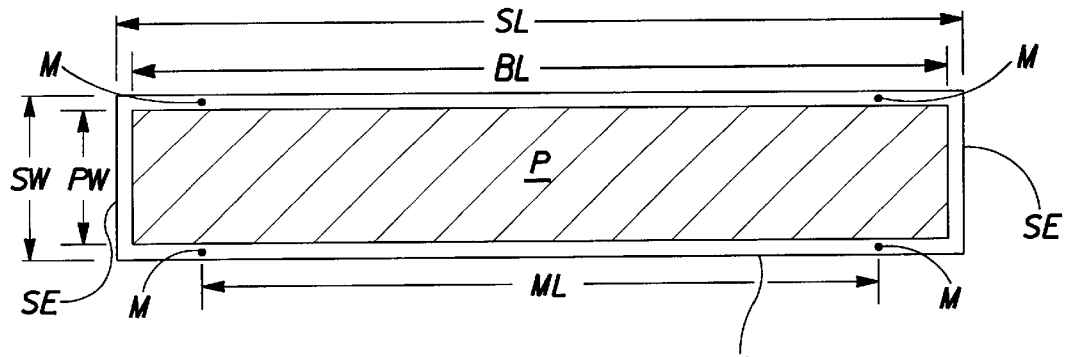
FIG. 1 is a plan view of a strip of material suitable for making belt with a pattern superimposed thereon to illustrate various dimensions relevant to the present invention.

Belt Fabrication:

FIG. 1 illustrates a strip of material suitable for making belt 10 in accordance with the method of the present invention. The strip of material has a pattern P superimposed thereon to illustrate various dimensions relevant to the present invention. The pattern P may take various forms, but by way of example may comprise a photographic negative of a pattern of apertures to be photoetched into a metal belt such as described in the aforementioned McGuire et al. application.

The strip has an initial length SL and an initial width SW. The strip length is measured parallel to the longitudinal axis of the strip, which will become the machine direction of the finished belt. Dimensions and markings are preferably, though not necessarily, made symmetrically with respect to a midpoint of the strip along the longitudinal centerline. The desired finished length of the belt (i.e., the circumference when formed into a closed loop) is designated BL, and the finished belt width in this example is equal to the strip width. The difference in length between SL and BL will be trimmed in preparation for joining the end edges SE, as described hereafter. If final trimming is not desired, SL and BL could be equal.

The pattern has a pattern length equal to the finished belt length BL and a pattern width PW which may be equal to the strip width SW but is preferably slightly less than SW to leave a uniform border for belt tracking purposes. It is important that the pattern length be equal to the finished belt length BL so that there is no break or seam in the pattern when the ends of the belt are fused together. It is likewise preferred that the opposing ends of the pattern have complementary shapes so that they "tile" or mate together to avoid creation of a visibly discernible seam when the ends of the pattern are joined together. A suitable technique for generating such a pattern of an amorphous variety is described hereafter.

To manufacture a belt 10 in accordance with the present invention, a strip of suitable belt-making material is provided having dimensions SL and SW. A wide variety of materials may be suitable for belt manufacture, depending upon the desired manufacturing operation. A sheet of 0.005 inch thick series 304 stainless steel has been found suitable for belt manufacture. For purposes of an illustrative example, a belt having a finished width of 12.5 inches and finished circumference/length of 72 inches will be assumed. The strip length SL is therefore slightly greater than 72 inches to allow for final trimming (i.e., strip edges SE will be removed), while the strip width SW is therefore 12.5 inches. A suitable pattern P is generated and a photographic negative thereof is prepared having a pattern width PW of 12 inches and a pattern length equal to the finished belt length BL, which is 72 inches. Four measurement marks M are placed on the strip outside of the space to be occupied by the pattern to aid in alignment of the negative during subsequent operations. Marks M may be of any shape, though 0.010 inch diameter circles have been found satisfactory. Marks M are placed symmetrically with respect to the longitudinal axis of the strip and define a measurement length ML, which is less than the finished belt length BL. The difference between BL and ML should be sufficient to provide clearance for fusion equipment and operations without disturbing an etched aperture pattern corresponding to pattern P. A difference of 2 inches at each end of the strip has been found satisfactory, such that for BL equal to 72 inches ML should equal 68 inches. The pattern P is then marked and the ends of the pattern beyond the measurement marks M are removed, joined to one another via their original marginal ends by computer or other techniques to form what is hereafter referred to as the "re-etch pattern", and saved for a subsequent step.

Figure 2:
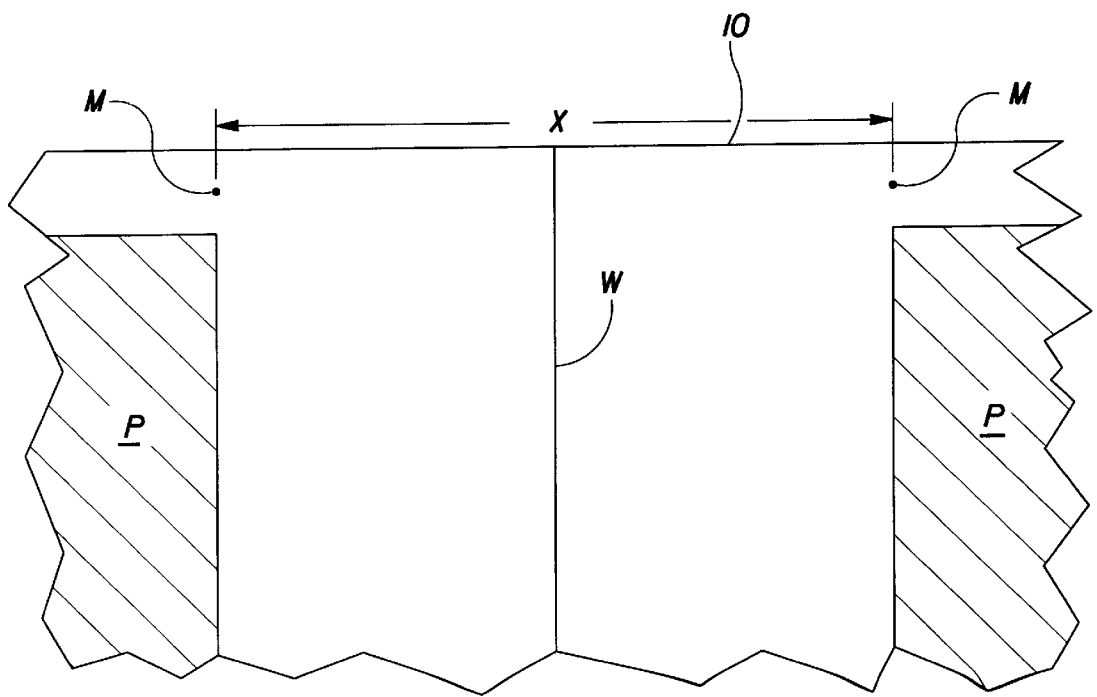
FIG. 2 is an enlarged partial plan view of the strip of FIG. 1 with the end edges fused together to illustrate additional dimensions relevant to the present invention.

The resulting trimmed pattern P is then etched into the strip, making sure that the trimmed ends of the pattern remain aligned with the measurement marks M. After the pattern has been etched into the strip, the two opposing ends of the strip are then brought into overlapping relationship until the measurement marks M are separated from one another by a distance X (see FIG. 2), which represents the difference between BL and ML and which corresponds to the total length of pattern removed earlier (the "re-etch pattern"). For the present example, the distance X would be 4 inches. The strip ends SE are then simultaneously removed along a common line to ensure that their profiles are identical, and the cut ends are then fused along a line W by butt-welding via a high energy beam (electron beam or laser beam) or other suitable technique depending upon the strip material. Since the strip material is uninterrupted by apertures or other geometries, the fusion produces a high quality, high strength seam.

After fusing the strip ends together to form the belt 10, the dimension X is re-measured to ensure that no deviations occurred during the fusion operation. Any minor deviations can be accommodated by "trimming" the saved portion of the pattern, if generated via computer, or other suitable technique for blending in the pattern edges. The re-etch pattern is then superimposed upon the "blank" area of the belt between the measurement marks M (oriented with the end edges facing the pattern edges from which they were severed) and the re-etch pattern is then photoetched into the belt.

While much of the foregoing discussion has focused upon the fabrication of a belt, i.e., a flexible structure which may conform to supporting rolls and assume a variety of pathway profiles when run on an apparatus, it should be understood that the present invention may also find applicability to the fabrication of seamless drums when the belt is in fact secured to a supporting structure and formed into a cylinder of circular cross-section and rotatably secured for operation in an apparatus.

It should also be understood that, while the preferred embodiments utilize a metal belt material, such as stainless steel, the method of the present invention may also be utilized in conjunction with other materials as well, such as polymeric materials, fabric, rubber, etc. so long as suitable aperturing and fusion techniques are employed.

Figure 3:
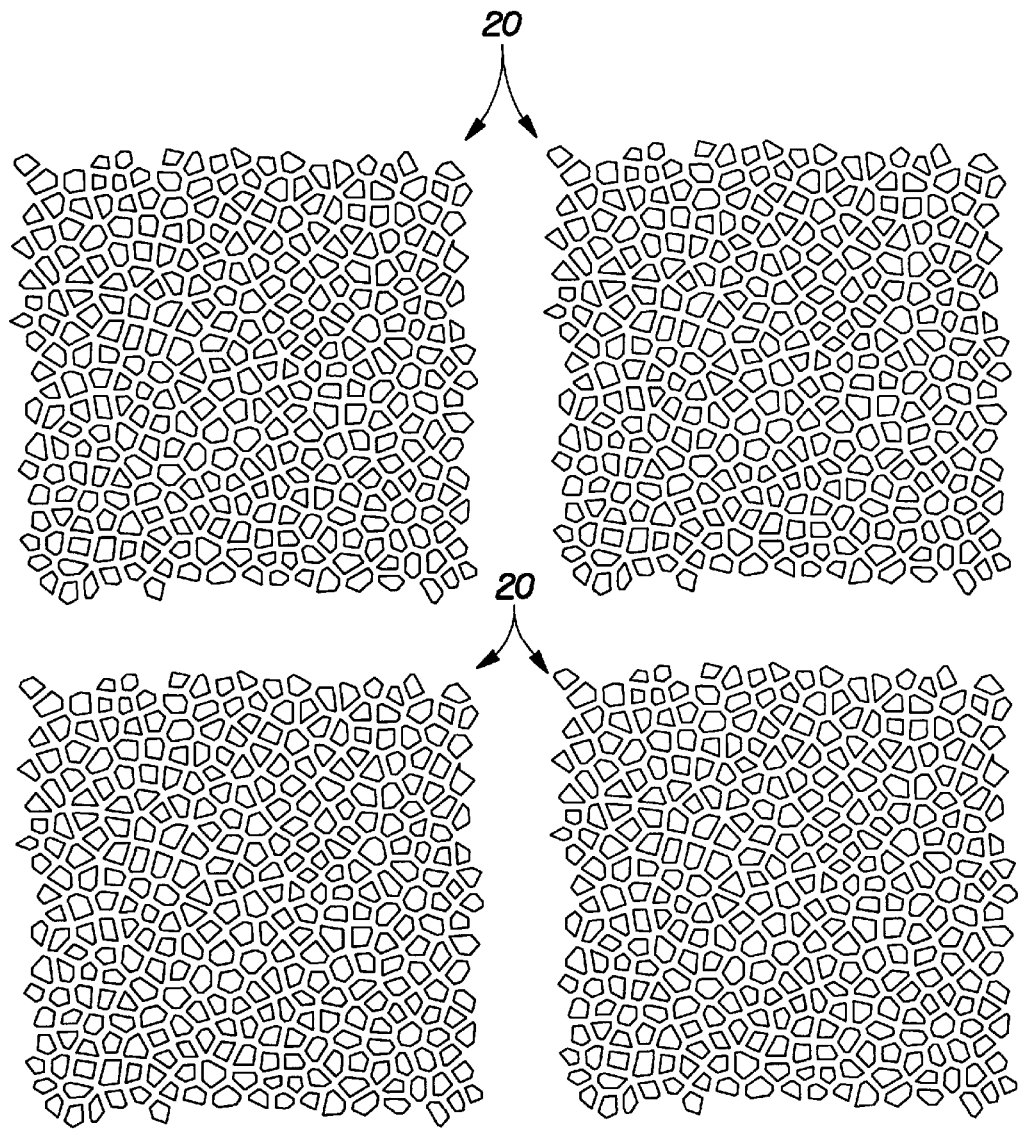
FIG. 3 is a plan view of four identical "tiles" of a representative embodiment of an amorphous pattern useful with the present invention.
Figure 4:
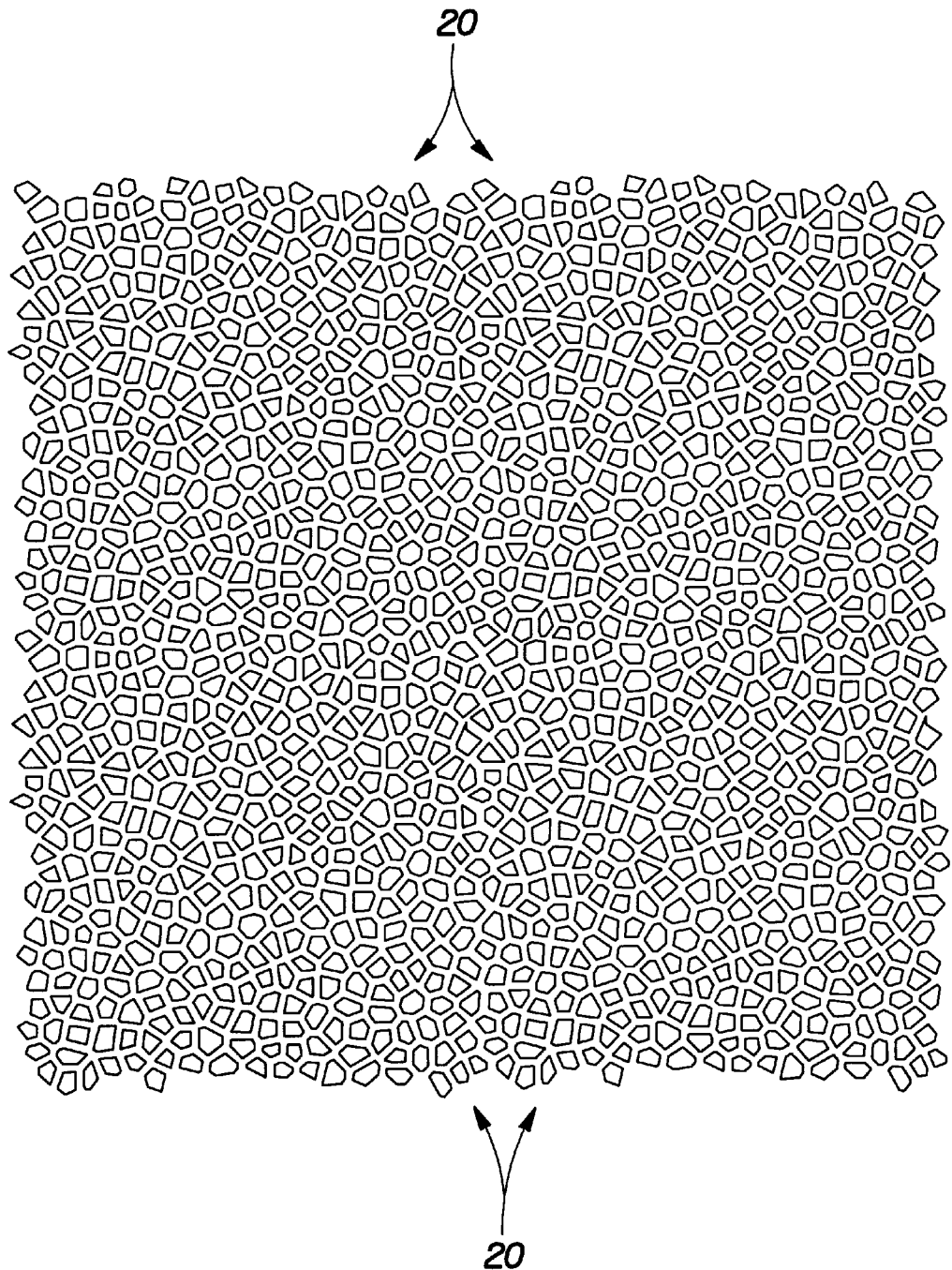
FIG. 4 is a plan view of the four "tiles" of FIG. 3 moved into closer proximity to illustrate the matching of the pattern edges.

Pattern Generation:

FIGS. 3 and 4 show a pattern 20 created using an algorithm described in greater detail in commonly-assigned, concurrently-filed, co-pending U.S. patent application Ser. No. 09/289,223, in the name of Kenneth S. McGuire, entitled "Method of Seaming and Expanding Amorphous Patterns", the disclosure of which is hereby incorporated herein by reference. It is obvious from FIGS. 3 and 4 that there is no appearance of a seam at the borders of the tiles 20 when they are brought into close proximity. Likewise, if opposite edges of a single pattern or tile were brought together, such as by wrapping the pattern around a belt or roll, the seam would likewise not be readily visually discernible.

As utilized herein, the term "amorphous" refers to a pattern which exhibits no readily perceptible organization, regularity, or orientation of constituent elements. This definition of the term "amorphous" is generally in accordance with the ordinary meaning of the term as evidenced by the corresponding definition in *Webster's Ninth New Collegiate Dictionary*. In such a pattern, the orientation and arrangement of one element with regard to a neighboring element bear no predictable relationship to that of the next succeeding element(s) beyond.

By way of contrast, the term "array" is utilized herein to refer to patterns of constituent elements which exhibit a regular, ordered grouping or arrangement. This definition of the term "array" is likewise generally in accordance with the ordinary meaning of the term as evidenced by the corresponding definition in *Webster's Ninth New Collegiate Dictionary*. In such an array pattern, the orientation and arrangement of one element with regard to a neighboring element bear a predictable relationship to that of the next succeeding element(s) beyond.

The degree to which order is present in an array pattern of three-dimensional protrusions bears a direct relationship to the degree of nestability exhibited by the web. For example, in a highly-ordered array pattern of uniformly-sized and shaped hollow protrusions in a close-packed hexagonal array, each protrusion is literally a repeat of any other protrusion. Nesting of regions of such a web, if not in fact the entire web, can be achieved with a web alignment shift between superimposed webs or web portions of no more than one protrusion-spacing in any given direction. Lesser degrees of order may demonstrate less nesting tendency, although any degree of order is believed to provide some degree of nestability. Accordingly, an amorphous, non-ordered pattern of protrusions would therefore exhibit the greatest possible degree of nesting-resistance.

Three-dimensional sheet materials having a two-dimensional pattern of three-dimensional protrusions which is substantially amorphous in nature are also believed to exhibit "isomorphism". As utilized herein, the terms "isomorphism" and its root "isomorphic" are utilized to refer to substantial uniformity in geometrical and structural properties for a given circumscribed area wherever such an area is delineated within the pattern. This definition of the term "isomorphic" is generally in accordance with the ordinary meaning of the term as evidenced by the corresponding definition in *Webster's Ninth New Collegiate Dictionary*. By way of example, a prescribed area comprising a statistically-significant number of protrusions with regard to the entire amorphous pattern would yield statistically substantially equivalent values for such web properties as protrusion area, number density of protrusions, total protrusion wall length, etc. Such a correlation is believed desirable with respect to physical, structural web properties when uniformity is desired across the web surface, and particularly so with regard to web properties measured normal to the plane of the web such as crush-resistance of protrusions, etc.

Utilization of an amorphous pattern of three-dimensional protrusions has other advantages as well. For example, it has been observed that three-dimensional sheet materials formed from a material which is initially isotropic within the plane of the material remain generally isotropic with respect to physical web properties in directions within the plane of the material. As utilized herein, the term "isotropic" is utilized to refer to web properties which are exhibited to substantially equal degrees in all directions within the plane of the material. This definition of the term "isotropic" is likewise generally in accordance with the ordinary meaning of the term as evidenced by the corresponding definition in *Webster's Ninth New Collegiate Dictionary*. Without wishing to be bound by theory, this is presently believed to be due to the non-ordered, non-oriented arrangement of the three-dimensional protrusions within the amorphous pattern. Conversely, directional web materials exhibiting web properties which vary by web direction will typically exhibit such properties in similar fashion following the introduction of the amorphous pattern upon the material. By way of example, such a sheet of material could exhibit substantially uniform tensile properties in any direction within the plane of the material if the starting material was isotropic in tensile properties.

Such an amorphous pattern in the physical sense translates into a statistically equivalent number of protrusions per unit length measure encountered by a line drawn in any given direction outwardly as a ray from any given point within the pattern. Other statistically equivalent parameters could include number of protrusion walls, average protrusion area, average total space between protrusions, etc. Statistical equivalence in terms of structural geometrical features with regard to directions in the plane of the web is believed to translate into statistical equivalence in terms of directional web properties.

Revisiting the array concept to highlight the distinction between arrays and amorphous patterns, since an array is by definition "ordered" in the physical sense it would exhibit some regularity in the size, shape, spacing, and/or orientation of protrusions. Accordingly, a line or ray drawn from a given point in the pattern would yield statistically different values depending upon the direction in which the ray extends for such parameters as number of protrusion walls, average protrusion area, average total space between protrusions, etc. with a corresponding variation in directional web properties.

Within the preferred amorphous pattern, protrusions will preferably be non-uniform with regard to their size, shape, orientation with respect to the web, and spacing between adjacent protrusion centers. Without wishing to be bound by theory, differences in center-to-center spacing of adjacent protrusions are believed to play an important role in reducing the likelihood of nesting occurring in the face-to-back nesting scenario. Differences in center-to-center spacing of protrusions in the pattern result in the physical sense in the spaces between protrusions being located in different spatial locations with respect to the overall web. Accordingly, the likelihood of a "match" occurring between superimposed portions of one or more webs in terms of protrusions/space locations is quite low. Further, the likelihood of a "match" occurring between a plurality of adjacent protrusions/spaces on superimposed webs or web portions is even lower due to the amorphous nature of the protrusion pattern.

In a completely amorphous pattern, as would be presently preferred, the center-to-center spacing is random, at least within a designer-specified bounded range, such that there is an equal likelihood of the nearest neighbor to a given protrusion occurring at any given angular position within the plane of the web. Other physical geometrical characteristics of the web are also preferably random, or at least non-uniform, within the boundary conditions of the pattern, such as the number of sides of the protrusions, angles included within each protrusion, size of the protrusions, etc. However, while it is possible and in some circumstances desirable to have the spacing between adjacent protrusions be non-uniform and/or random, the selection of polygon shapes which are capable of interlocking together makes a uniform spacing between adjacent protrusions possible. This is particularly useful for some applications of the three-dimensional, nesting-resistant sheet materials of the present invention, as will be discussed hereafter.

As used herein, the term "polygon" (and the adjective form "polygonal") is utilized to refer to a two-dimensional geometrical figure with three or more sides, since a polygon with one or two sides would define a line. Accordingly, triangles, quadrilaterals, pentagons, hexagons, etc. are included within the term "polygon", as would curvilinear shapes such as circles, ellipses, etc. which would have an infinite number of sides.

When describing properties of two-dimensional structures of non-uniform, particularly non-circular, shapes and non-uniform spacing, it is often useful to utilize "average" quantities and/or "equivalent" quantities. For example, in terms of characterizing linear distance relationships between objects in a two-dimensional pattern, where spacings on a center-to-center basis or on an individual spacing basis, an "average" spacing term may be useful to characterize the resulting structure. Other quantities that could be described in terms of averages would include the proportion of surface area occupied by objects, object area, object circumference, object diameter, etc. For other dimensions such as object circumference and object diameter, an approximation can be made for objects which are non-circular by constructing a hypothetical equivalent diameter as is often done in hydraulic contexts.

A totally random pattern of three-dimensional hollow protrusions in a web would, in theory, never exhibit face-to-back nesting since the shape and alignment of each frustum would be unique. However, the design of such a totally random pattern would be very time-consuming and complex proposition, as would be the method of manufacturing a suitable forming structure. In accordance with the present invention, the non-nesting attributes may be obtained by designing patterns or structures where the relationship of adjacent cells or structures to one another is specified, as is the overall geometrical character of the cells or structures, but wherein the precise size, shape, and orientation of the cells or structures is non-uniform and non-repeating. The term "non-repeating", as utilized herein, is intended to refer to patterns or structures where an identical structure or shape is not present at any two locations within a defined area of interest. While there may be more than one protrusion of a given size and shape within the pattern or area of interest, the presence of other protrusions around them of non-uniform size and shape virtually eliminates the possibility of an identical grouping of protrusions being present at multiple locations. Said differently, the pattern of protrusions is non-uniform throughout the area of interest such that no grouping of protrusions within the overall pattern will be the same as any other like grouping of protrusions. The beam strength of the three-dimensional sheet material will prevent significant nesting of any region of material surrounding a given protrusion even in the event that that protrusion finds itself superimposed over a single matching depression since the protrusions surrounding the single protrusion of interest will differ in size, shape, and resultant center-to-center spacing from those surrounding the other protrusion/depression.

Professor Davies of the University of Manchester has been studying porous cellular ceramic membranes and, more particularly, has been generating analytical models of such membranes to permit mathematical modeling to simulate real-world performance. This work was described in greater detail in a publication entitled "Porous cellular ceramic membranes: a stochastic model to describe the structure of an anodic oxide membrane", authored by J. Broughton and G. A. Davies, which appeared in the *Journal of Membrane Science*, Vol. 106 (1995), at pp. 89–101, the disclosure of which is hereby incorporated herein by reference. Other related mathematical modeling techniques are described in greater detail in "Computing the n-dimensional Delaunay tessellation with application to Voronoi polytopes", authored by D. F. Watson, which appeared in *The Computer Journal*, Vol. 24, No. 2 (1981), at pp. 167–172, and "Statistical Models to Describe the Structure of Porous Ceramic Membranes", authored by J. F. F. Lim, X. Jia, R. Jafferali, and G. A. Davies, which appeared in *Separation Science and Technology*, 28(1–3) (1993) at pp. 821–854, the disclosures of both of which are hereby incorporated herein by reference.

As part of this work, Professor Davies developed a two-dimensional polygonal pattern based upon a constrained Voronoi tessellation of 2-space. In such a method, again with reference to the above-identified publication, nucleation points are placed in random positions in a bounded (pre-determined) plane which are equal in number to the number of polygons desired in the finished pattern. A computer program "grows" each point as a circle simultaneously and radially from each nucleation point at equal rates. As growth fronts from neighboring nucleation points meet, growth stops and a boundary line is formed. These boundary lines each form the edge of a polygon, with vertices formed by intersections of boundary lines.

While this theoretical background is useful in understanding how such patterns may be generated and the properties of such patterns, there remains the issue of performing the above numerical repetitions step-wise to propagate the nucleation points outwardly throughout the desired field of interest to completion. Accordingly, to expeditiously carry out this process a computer program is preferably written to perform these calculations given the appropriate boundary conditions and input parameters and deliver the desired output.

The first step in generating a pattern useful in accordance with the present invention is to establish the dimensions of the desired pattern. For example, if it is desired to construct a pattern 10 inches wide and 10 inches long, for optionally forming into a drum or belt as well as a plate, then an X-Y coordinate system is established with the maximum X dimension ($x_{max}$) being 10 inches and the maximum Y dimension ($y_{max}$) being 10 inches (or vice-versa).

Figure 5:
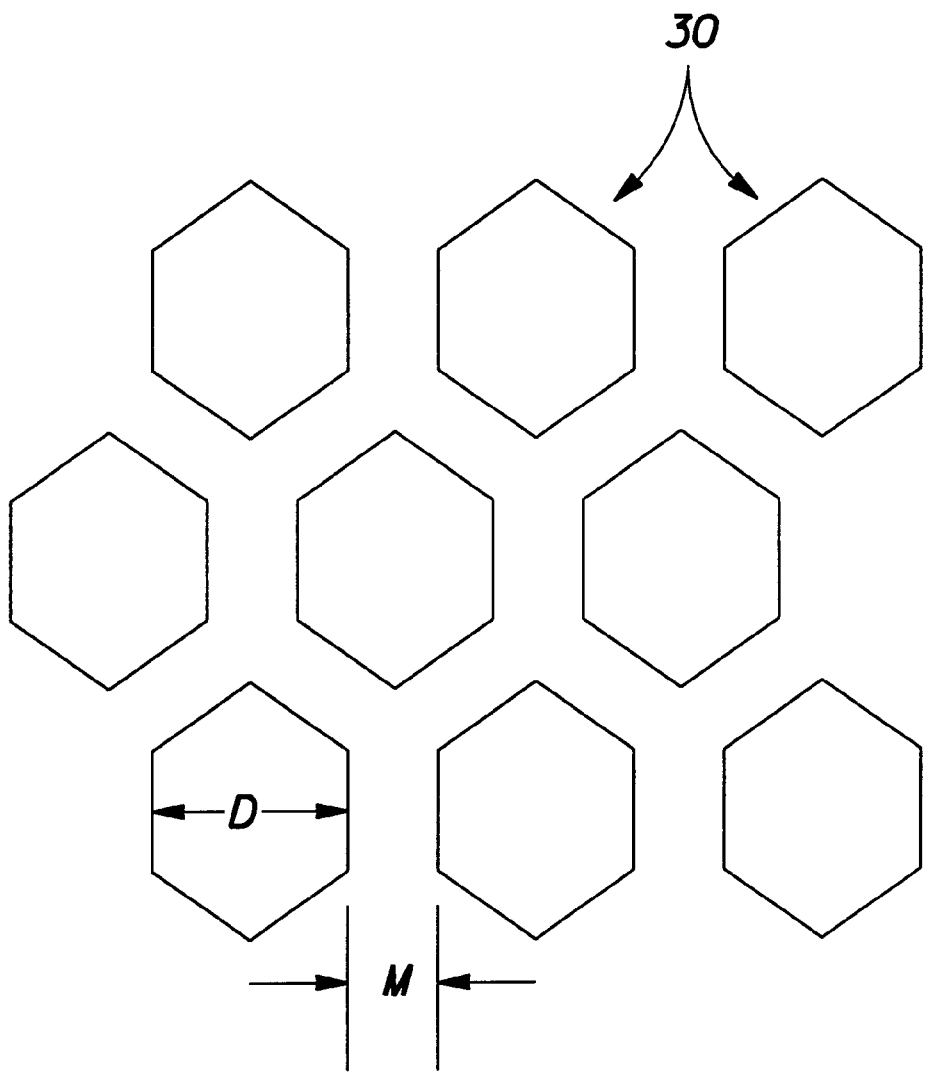
FIG. 5 is a schematic illustration of dimensions referenced in the pattern generation equations useful with the present invention.

After the coordinate system and maximum dimensions are specified, the next step is to determine the number of "nucleation points" which will become polygons desired within the defined boundaries of the pattern. This number is an integer between 0 and infinity, and should be selected with regard to the average size and spacing of the polygons desired in the finished pattern. Larger numbers correspond to smaller polygons, and vice-versa. A useful approach to determining the appropriate number of nucleation points or polygons is to compute the number of polygons of an artificial, hypothetical, uniform size and shape that would be required to fill the desired forming structure. If this artificial pattern is an array of regular hexagons 30 (see FIG. 5), with D being the edge-to-edge dimension and M being the spacing between the hexagons, then the number density of hexagons, N, is:

$$N = \frac{2\sqrt{3}}{3(D+M)^2}$$

It has been found that using this equation to calculate a nucleation density for the amorphous patterns generated as described herein will give polygons with average size closely approximating the size of the hypothetical hexagons (D). Once the nucleation density is known, the total number of nucleation points to be used in the pattern can be calculated by multiplying by the area of the pattern (80 in$^2$ in the case of this example).

A random number generator is required for the next step. Any suitable random number generator known to those skilled in the art may be utilized, including those requiring a "seed number" or utilizing an objectively determined starting value such as chronological time. Many random number generators operate to provide a number between zero and one ( 0–1), and the discussion hereafter assumes the use of such a generator. A generator with differing output may also be utilized if the result is converted to some number between zero and one or if appropriate conversion factors are utilized.

A computer program is written to run the random number generator the desired number of iterations to generate as many random numbers as is required to equal twice the desired number of "nucleation points" calculated above. As the numbers are generated, alternate numbers are multiplied by either the maximum X dimension or the maximum Y dimension to generate random pairs of X and Y coordinates all having X values between zero and the maximum X dimension and Y values between zero and the maximum Y dimension. These values are then stored as pairs of (X,Y) coordinates equal in number to the number of "nucleation points".

Figure 6:
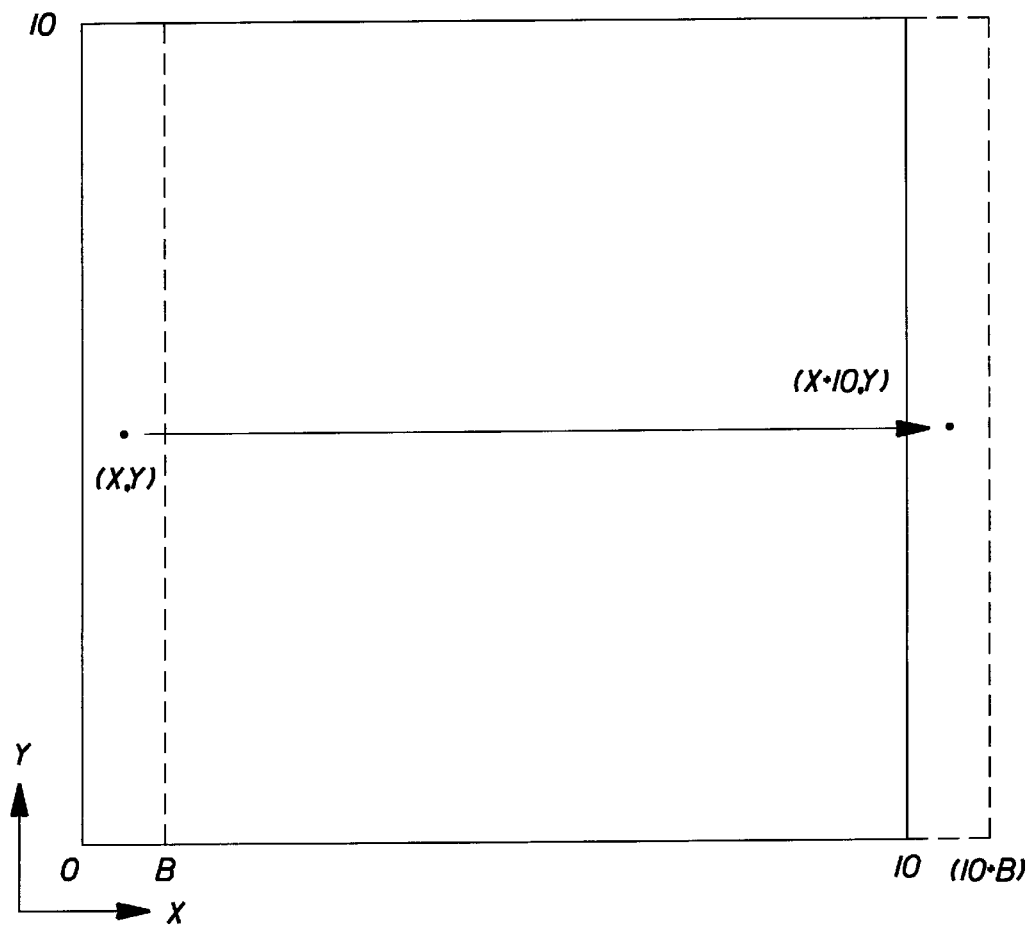
FIG. 6 is a schematic illustration of dimensions referenced in the pattern generation equations useful with the present invention.

It is at this point, that the invention described herein differs from the pattern generation algorithm described in the previous McGuire et al. application. Assuming that it is desired to have the left and right edge of the pattern "mesh", i.e., be capable of being "tiled" together, a border of width B is added to the right side of the 10" square (see FIG. 6). The size of the required border is dependent upon the nucleation density; the higher the nucleation density, the smaller is the required border size. A convenient method of computing the border width, B, is to refer again to the hypothetical regular hexagon array described above and shown in FIG. 5. In general, at least three columns of hypothetical hexagons should be incorporated into the border, so the border width can be calculated as:

$$B=3(D+H)$$

Now, any nucleation point P with coordinates (x,y) where x<B will be copied into the border as another nucleation point, P', with a new coordinate $(x_{max}+x,y)$.

If the method described in the preceding paragraphs is utilized to generate a resulting pattern, the pattern will be truly random. This truly random pattern will, by its nature, have a large distribution of polygon sizes and shapes which may be undesirable in some instances. In order to provide some degree of control over the degree of randomness associated with the generation of "nucleation point" locations, a control factor or "constraint" is chosen and referred to hereafter as β (beta). The constraint limits the proximity of neighboring nucleation point locations through the introduction of an exclusion distance, E, which represents the minimum distance between any two adjacent nucleation points. The exclusion distance E is computed as follows:

$$E = \frac{2\beta}{\sqrt{\lambda\pi}}$$

where λ (lambda) is the number density of points (points per unit area) and β ranges from 0 to 1.

To implement the control of the "degree of randomness", the first nucleation point is placed as described above. β is then selected, and E is calculated from the above equation. Note that β, and thus E, will remain constant throughout the placement of nucleation points. For every subsequent nucleation point (x,y) coordinate that is generated, the distance from this point is computed to every other nucleation point that has already been placed. If this distance is less than E for any point, the newly-generated (x,y) coordinates are deleted and a new set is generated. This process is repeated until all N points have been successfully placed. Note that in the tiling algorithm useful in accordance with the present invention, for all points (x,y) where x<B, both the original point P and the copied point P' must be checked against all other points. If either P or P' is closer to any other point than E, then both P and P' are deleted, and a new set of random (x,y) coordinates is generated.

If β=0, then the exclusion distance is zero, and the pattern will be truly random. If β=1, the exclusion distance is equal to the nearest neighbor distance for a hexagonally close-packed array. Selecting β between 0 and 1 allows control over the "degree of randomness" between these two extremes.

In order to make the pattern a tile in which both the left and right edges tile properly and the top and bottom edges tile properly, borders will have to be used in both the X and Y directions.

Once the complete set of nucleation points are computed and stored, a Delaunay triangulation is performed as the precursor step to generating the finished polygonal pattern. The use of a Delaunay triangulation in this process constitutes a simpler but mathematically equivalent alternative to iteratively "growing" the polygons from the nucleation points simultaneously as circles, as described in the theoretical model above. The theme behind performing the triangulation is to generate sets of three nucleation points forming triangles, such that a circle constructed to pass through those three points will not include any other nucleation points within the circle. To perform the Delaunay triangulation, a computer program is written to assemble every possible combination of three nucleation points, with each nucleation point being assigned a unique number (integer) merely for identification purposes. The radius and center point coordinates are then calculated for a circle passing through each set of three triangularly-arranged points. The coordinate locations of each nucleation point not used to define the particular triangle are then compared with the coordinates of the circle (radius and center point) to determine whether any of the other nucleation points fall within the circle of the three points of interest. If the constructed circle for those three points passes the test (no other nucleation points falling within the circle), then the three point numbers, their X and Y coordinates, the radius of the circle, and the X and Y coordinates of the circle center are stored. If the constructed circle for those three points fails the test, no results are saved and the calculation progresses to the next set of three points.

Once the Delaunay triangulation has been completed, a Voronoi tessellation of 2-space is then performed to generate the finished polygons. To accomplish the tessellation, each nucleation point saved as being a vertex of a Delaunay triangle forms the center of a polygon. The outline of the polygon is then constructed by sequentially connecting the center points of the circumscribed circles of each of the Delaunay triangles, which include that vertex, sequentially in clockwise fashion. Saving these circle center points in a repetitive order such as clockwise enables the coordinates of the vertices of each polygon to be stored sequentially throughout the field of nucleation points. In generating the polygons, a comparison is made such that any triangle vertices at the boundaries of the pattern are omitted from the calculation since they will not define a complete polygon.

If it is desired for ease of tiling multiple copies of the same pattern together to form a larger pattern, the polygons generated as a result of nucleation points copied into the computational border may be retained as part of the pattern and overlapped with identical polygons in an adjacent pattern to aid in matching polygon spacing and registry. Alternatively, as shown in FIGS. 3 and 4, the polygons generated as a result of nucleation points copied into the computational border may be deleted after the triangulation and tessellation are performed such that adjacent patterns may be abutted with suitable polygon spacing.

Once a finished pattern of interlocking polygonal two-dimensional shapes is generated, in accordance with the present invention such a network of interlocking shapes is utilized as the design for one web surface of a web of material with the pattern defining the shapes of the bases of the three-dimensional, hollow protrusions formed from the initially planar web of starting material. In order to accomplish this formation of protrusions from an initially planar web of starting material, a suitable forming structure comprising a negative of the desired finished three-dimensional structure is created which the starting material is caused to conform to by exerting suitable forces sufficient to permanently deform the starting material.

From the completed data file of polygon vertex coordinates, a physical output such as a line drawing may be made of the finished pattern of polygons. This pattern may be utilized in conventional fashion as the input pattern for a metal screen etching process to form a three-dimensional forming structure. If a greater spacing between the polygons is desired, a computer program can be written to add one or more parallel lines to each polygon side to increase their width (and hence decrease the size of the polygons a corresponding amount).

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A method for making a seamless apertured belt, said method comprising the steps of:
   (a) providing a strip of material having two opposing ends and having a length at least equal to a finished belt length;
   (b) providing an aperture pattern having a length substantially equal to said finished belt length, said pattern including a plurality of two-dimensional geometrical shapes, said pattern having opposing end edges which can be tiled together;
   (c) removing a pre-determined portion of each end of said pattern and joining said pre-determined portions to one another along said opposing end edges to form a re-etch pattern;
   (d) forming apertures in said strip corresponding to said two-dimensional geometrical shapes in said pattern, said strip remaining free of apertures in regions near each end comprising fusion zones;
   (e) fusing said ends of said strip to one another such that said fusion zones form a common fusion zone; and
   (f) forming apertures in said common fusion zone corresponding to said re-etch pattern.

2. The method of claim 1, wherein said two-dimensional pattern is an amorphous two-dimensional pattern of interlocking two-dimensional geometrical shapes.

3. The method of claim 1, wherein said strip comprises a material selected from the group consisting of metal, plastic, fabric, rubber, and combinations thereof.

4. The method of claim 1, wherein said strip has an initial length which is longer than said finished belt length, and wherein said ends of said strip are trimmed to attain said finished belt length prior to said step of fusing said ends together.

5. The method of claim 4, wherein said ends of said strip are overlapped with one another and trimmed along a common line to said finished belt length.

6. The method of claim 1, wherein strip of material is metal and said ends are fused via a welding operation.

7. The method of claim 1, wherein said pattern comprises a photographic negative and said apertures are formed by a photoetching process.

8. The method of claim 1, further including the step of marking said strip with measurement marks a predetermined distance from each of said ends to define a fusion zone at each end prior to removing pre-determined portions of said pattern, said pre-determined portions corresponding to said fusion zones.

9. The method of claim 1, wherein said method results in a finished belt having no readily discernible seam or interruption in the pattern of apertures.

10. The method of claim 1, wherein said belt is secured to a supporting structure and formed into a cylinder of circular cross-section to form a drum.

* * * * *

UNITED STATES PATENT AND TRADEMARK OFFICE
CERTIFICATE OF CORRECTION

PATENT NO.    : 6,148,496
DATED         : November 21, 2000
INVENTOR(S)   : Kenneth S. McGuire et al.

It is certified that error appears in the above-identified patent and that said Letters Patent is hereby corrected as shown below:

Column 4,
Line 56, "09/289,223" should read -- 09/288,736 --.

Signed and Sealed this

Second Day of July, 2002

Attest:

Attesting Officer

JAMES E. ROGAN
Director of the United States Patent and Trademark Office